(12) United States Patent
Pytel

(10) Patent No.: US 7,917,573 B2
(45) Date of Patent: Mar. 29, 2011

(54) MEASURING AND REPORTING PROCESSOR CAPACITY AND PROCESSOR USAGE IN A COMPUTER SYSTEM WITH PROCESSORS OF DIFFERENT SPEED AND/OR ARCHITECTURE

(75) Inventor: Alexei Leonidovich Pytel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1113 days.

(21) Appl. No.: 11/290,885

(22) Filed: Nov. 30, 2005

(65) Prior Publication Data

US 2007/0124730 A1 May 31, 2007

(51) Int. Cl.
*G06F 15/16* (2006.01)
(52) U.S. Cl. .................................................. 709/201
(58) Field of Classification Search .............. 348/E5.006, 348/E5.008, E7.06, E7.07; 375/E7.009, 375/E7.024; 705/53, 57, 80; 712/220, 23, 712/E9.033, E9.071, 244; 710/260, 100, 710/62, 107, 104, 8, 52; 711/147, 122, 121, 711/E12.059; 709/201
See application file for complete search history.

(56) References Cited

U.S. PATENT DOCUMENTS

| | | | | |
|---|---|---|---|---|
| 5,761,091 A * | 6/1998 | Agrawal et al. | ............... | 702/186 |
| 5,961,599 A * | 10/1999 | Kalavade et al. | ............. | 709/224 |
| 6,009,514 A * | 12/1999 | Henzinger et al. | ............ | 712/236 |
| 6,266,745 B1 | 7/2001 | de Backer et al. | | |
| 6,983,398 B2 * | 1/2006 | Prabhu | ............................. | 714/12 |
| 7,328,363 B2 * | 2/2008 | Mukherjee | ........................ | 714/1 |
| 2002/0062288 A1 | 5/2002 | Ooishi | | |
| 2002/0156824 A1 | 10/2002 | Armstrong et al. | | |
| 2003/0055602 A1 | 3/2003 | Sato et al. | | |
| 2003/0065409 A1 * | 4/2003 | Raeth et al. | ..................... | 700/31 |
| 2003/0088668 A1 * | 5/2003 | Stanley | ......................... | 709/224 |
| 2005/0108717 A1 * | 5/2005 | Hong et al. | .................. | 718/102 |

(Continued)

FOREIGN PATENT DOCUMENTS

WO 0114961 A3 3/2001

(Continued)

OTHER PUBLICATIONS

Galtier, V., Mills, K., Carlinet, Y., Bush, S., Kulkarni, A. (2002). Predicting and Controlling Resource Usage in a Heterogeneous Active Network. Third Annual International Active Middleware Services, 2001, 35-44.*

(Continued)

*Primary Examiner* — Jeffrey Pwu
*Assistant Examiner* — Saad A Waqas
(74) *Attorney, Agent, or Firm* — Martin & Associates, LLC; Derek P. Martin (57) ABSTRACT

In a computer system that includes multiple processors, each processor in a computer system is assigned a processor class. Processor capacity and usage are monitored according to the class assigned to the processor. Capacity and usage are reported on a class-by-class basis so that the capacity and performance of different classes of processors are not erroneously compared or summed. The capacity and usage are monitored and reported in an abstract unit of measurement referred to as a "CPU time unit". Processors of the same type that run at different clock speeds or that have different internal circuitry enabled are preferably assigned the same class, with one or more conversion factors being used to appropriately scale the performance of the processors to the common CPU time unit for this class.

5 Claims, 6 Drawing Sheets

U.S. PATENT DOCUMENTS

| | | | |
|---|---|---|---|
| 2005/0198635 A1* | 9/2005 | Olszewski et al. | 718/100 |
| 2006/0010449 A1* | 1/2006 | Flower et al. | 718/102 |
| 2006/0015773 A1* | 1/2006 | Singh et al. | 714/13 |

FOREIGN PATENT DOCUMENTS

| | | |
|---|---|---|
| WO | 2004088507 A | 10/2004 |

OTHER PUBLICATIONS

Galtier, V., Mills, K., Carlinet, Y., Leigh, S., Rukhin, A., (2000). Expressing Meaningful Processing Requirements among Heterogeneous Noes in an Active Network. Proceedings of the 2nd International Workshop on Software and Performance (2028). NY: ACM.*

Galtier et al. 2002. "Predicting and Controlling Resource Usage in a Heterogeneous Active Network".*

IBM Publication IPCOM000012949D, "Accurate and Unbiased CPU Utilization Statistics for MP Machines," Jan. 1, 2001.

IBM Publication IPCOM000014044D, "Unbiased, Accurated CPU Utilization Measurement for MP and UP Systems Independent of MP Scheduling Algorithms," Mar. 1, 2000.

* cited by examiner

Where CPU1 is same type as CPU2 and CLK1 ≠ CLK2

FIG. 6

Where CPU1 is different type than CPU2

MEASURING AND REPORTING PROCESSOR CAPACITY AND PROCESSOR USAGE IN A COMPUTER SYSTEM WITH PROCESSORS OF DIFFERENT SPEED AND/OR ARCHITECTURE

BACKGROUND OF THE INVENTION

1. Technical Field

This invention generally relates to computer systems, and more specifically relates to the measurement of processor capacity and usage in a computer system.

2. Background Art

Various methods have been developed for measuring the performance of a computer system. One measurement that is often of interest is the usage of a central processing unit (CPU), also referred to herein and in the art as a processor, by a system and by applications running on a system. CPU usage is typically reported in time units, such as processor-seconds. For a CPU that is multi-threaded, the CPU time for each thread may be monitored so the amount of time spent executing each thread may be determined.

The prior art methods for measuring CPU usage in absolute time units is appropriate only if certain assumptions are true. For example, if there is only one processor present in the computer system, and if the clock speed of the processor does not change, the amount of CPU resource used by an application may be reported directly in time units. If there are multiple processors present in the computer system, and if all of the processors are of the same type and are running at the same clock speed with the same internal circuitry enabled, the amount of CPU resource used by an application may still be reported directly in time units, because one second used on one processor means the same amount of work as one second used on any other processor in the system. Many modern computer systems, however, have configurations that do not adhere to these assumptions that allow directly comparing performance of a first processor in absolute time units to performance of a second processor in absolute time units. For example, some computer systems have different modes that allow the processor to run at different clock speeds, or to run with different internal circuitry enabled. Some computer systems include multiple processors of the same type that run at different clock speeds, or multiple processors of different types. Comparing one processor-second of a processor at one clock speed to a processor-second on a processor at a different clock speed is like comparing apples to oranges. For this reason, prior art methods of measuring processor capacity and usage are inadequate. Without an apparatus and method for measuring and reporting capacity and usage of processors of different speed and/or architecture, the processor capacity and performance in a computer system that contains processors of different speed and/or architecture will not be readily measurable.

DISCLOSURE OF INVENTION

According to the preferred embodiments, each processor in a computer system is assigned a processor class. Processor capacity and usage are monitored according to the class assigned to the processor. Capacity and usage are reported on a class-by-class basis so that the capacity and performance of different classes of processors are not erroneously compared or summed. The capacity and usage are monitored and reported in an abstract unit of measurement referred to as a "CPU time unit". Processors of the same type that run at different clock speeds or that have different internal circuitry enabled are preferably assigned the same class, with one or more conversion factors being used to appropriately scale the performance of the processors to the common CPU time unit for this class.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments separate processors in a multi-processor computer system into different classes, and track both system CPU capacity and CPU time usage on a per-class basis. If multiple processors of the same type are present that run at different clock speeds or that have different internal circuitry enabled, these processors are preferably members of the same class, with one or more conversion factors used to scale the capacity and performance of processors in a selected class to common CPU time units.

Figure 1:
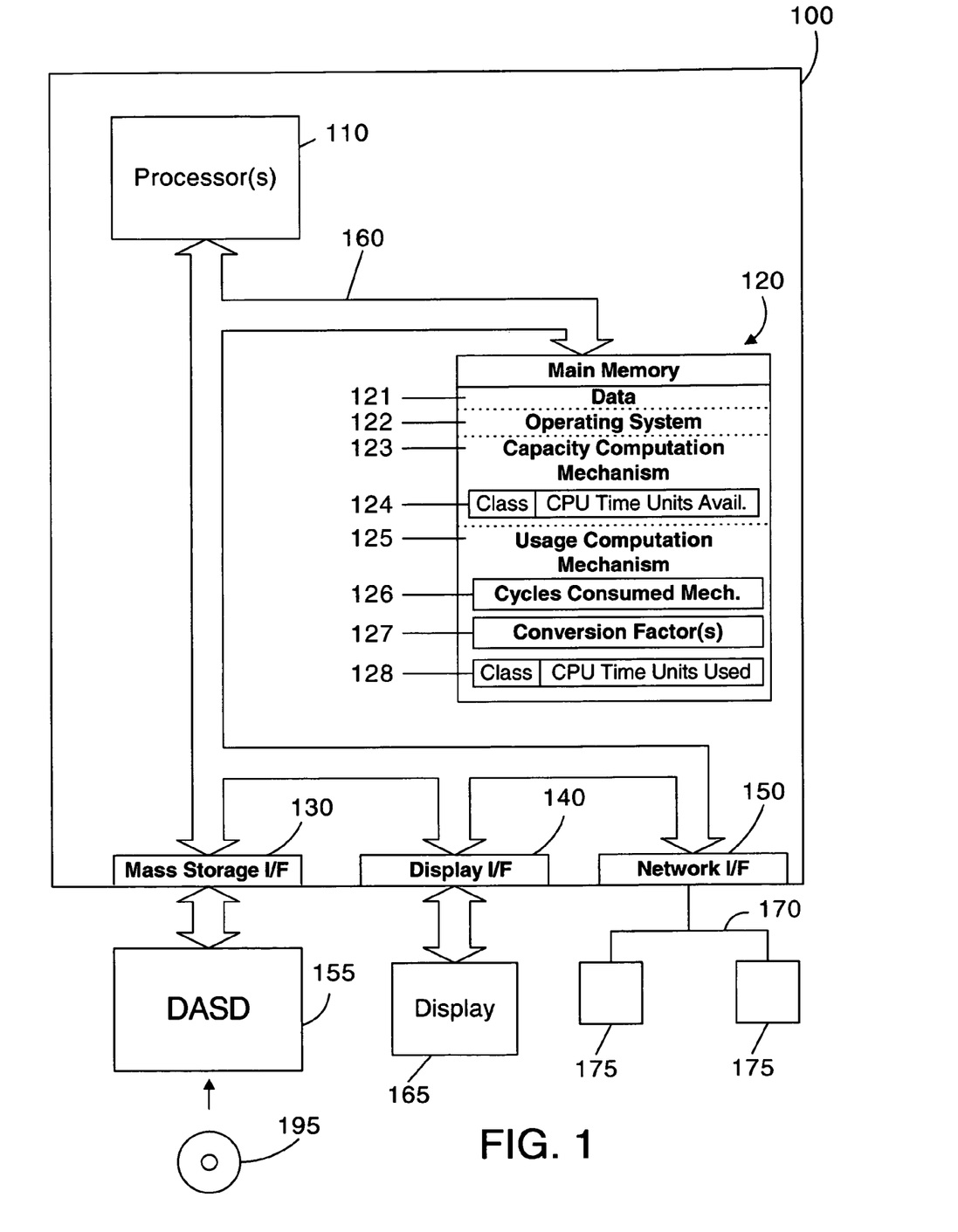
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a capacity computation mechanism 123, and a usage computation mechanism 125. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. The capacity computation mechanism 123 divides the processors (or CPUs) of a computer system into classes, and computes capacity on a class-by-class basis. Thus, each class of processor will have an entry 124 that specifies the class and corresponding CPU time units available for that class. CPU time units available to a CPU class during a given time period is a measure of CPU capacity available to be used by applications on processors belonging to this class in the given time period.

The usage computation mechanism 125 also functions on a class-by-class basis. A cycles consumed mechanism 126 tracks the number of processor cycles consumed for each processor. One or more conversion factors 127 may be used to scale the cycles consumed for a processor at a given clock speed to a common CPU time unit for this class. Thus, each class of processor will have an entry 128 that specifies the class and corresponding CPU time units used for that class. Note that the usage computation mechanism can not only report the CPU time units used for each class, but may also report the percentage of usage by dividing the CPU time units used for a class by the CPU time units available for that class, as determined by the capacity computation mechanism 123.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, capacity computation mechanism 123, and usage computation mechanism 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Each processor 110 may be constructed from one or more microprocessors and/or integrated circuits. A processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 2:
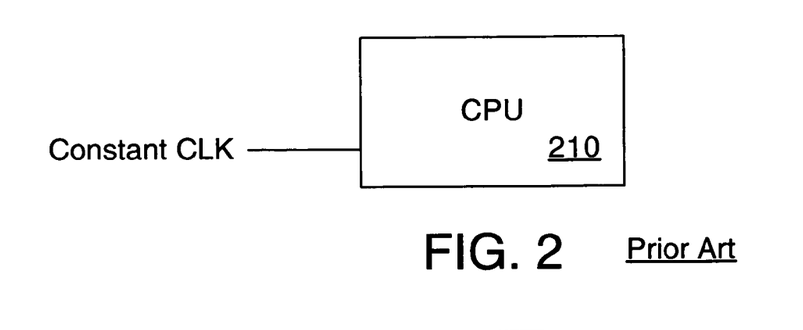
FIG. 2 is a block diagram of a prior art single CPU that is clocked by a constant clock.

We now present a discussion of known capacity and usage reporting mechanisms to provide a context for discussing the preferred embodiments. Referring to FIG. 2, a prior art computer system includes a single CPU 210 that is clocked by a constant clock, i.e., a clock with a frequency that does not change. The prior art could also include multiple processors of the same architecture that are all clocked by the same constant clock. The capacity for a prior art computer system that has only processors of the same architecture that are clocked with the same constant clock may be computed using method 300 shown in FIG. 3. First, the number of processors N in the computer system is determined (step 310). The time in seconds of a given time period is then determined (step 320). The capacity of the system is the number N of processors times the number of seconds in the given time period (step 330). Thus, a system with two processors will have a capacity of two processor-seconds for each second of time. The system in FIG. 2 with one processor will have a capacity of one processor-second for each second of time.

Figure 4:
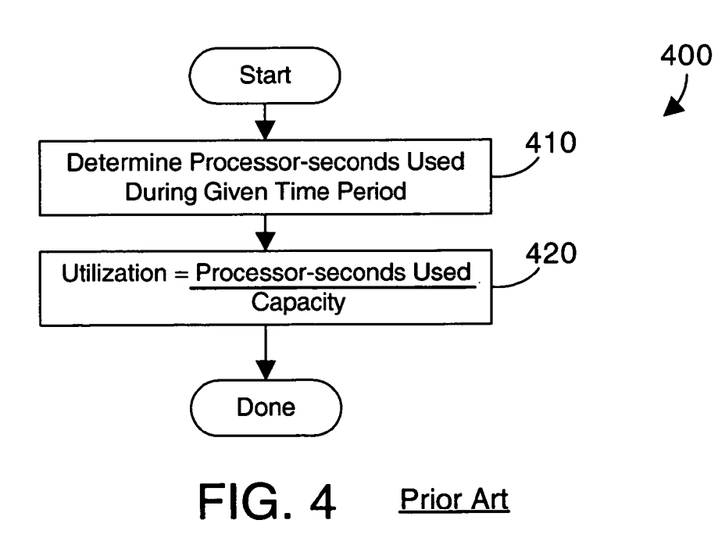
FIG. 4 is a flow diagram of a prior art method for determining the CPU utilization for the CPU in the system in FIG. 2.

Referring now to FIG. 4, a method 400 shows how processor usage and utilization was computed in the prior art. Processor usage is the number of processor-seconds used during a given time period (step 410). Utilization is a percentage that may be determined by dividing the processor-seconds used during the given time period by the capacity for the same given time period (step 420). Note that in the prior art, processor usage is denominated in processor-seconds, while processor utilization is denominated as a percentage of processor capacity.

Figure 3:
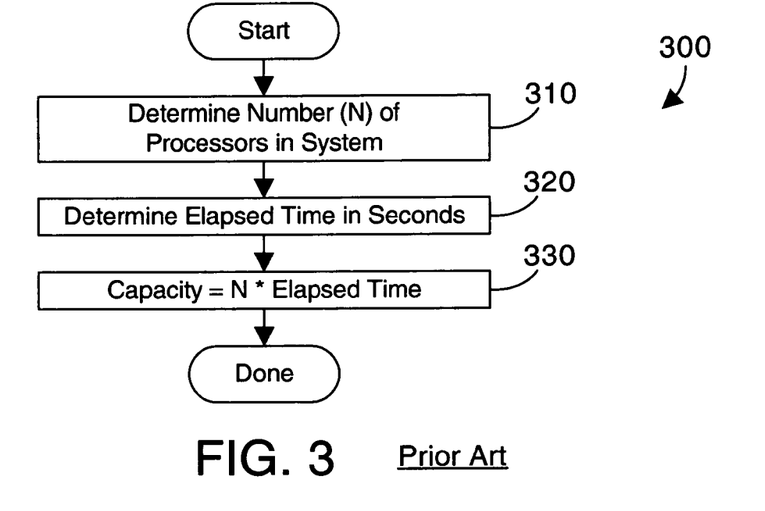
FIG. 3 is a flow diagram of a prior art method for determining the capacity of the system in FIG. 2.
Figure 5:
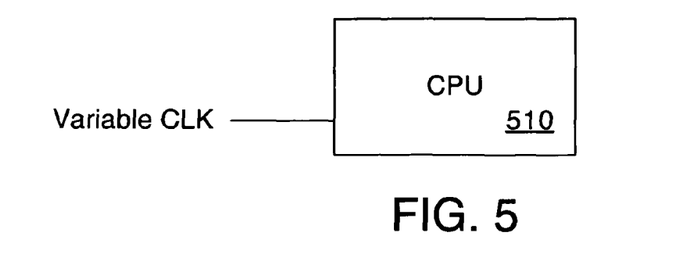
FIG. 5 is a block diagram showing a sample system that includes a single CPU with a variable clock.
Figure 6:
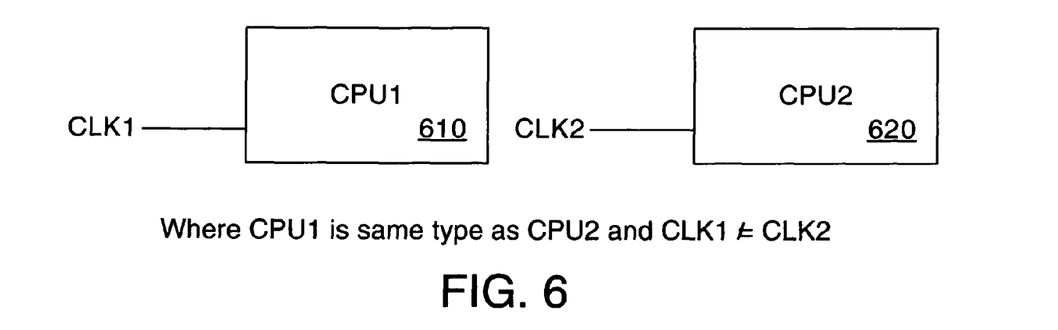
FIG. 6 is a block diagram showing a sample system that includes two CPUs of the same type that are clocked by different-speed clocks.
Figure 7:
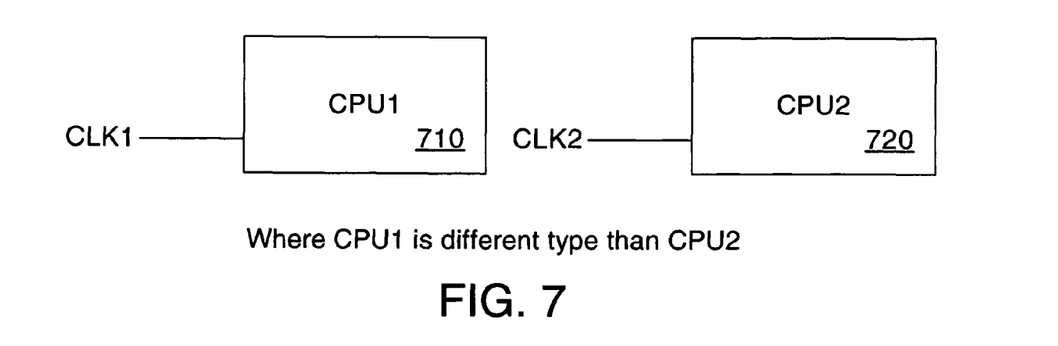
FIG. 7 is a block diagram showing a sample system that includes two CPUs of different type that are clocked by different clocks.

We now present three different system configurations in FIGS. 5-7 that make it difficult or impossible to accurately measure and report processor capacity and usage using the standard processor-seconds used in the prior art, as shown in FIGS. 3 and 4. FIG. 5 shows a system that includes a single CPU 510 that is clocked with a variable clock, i.e., a clock that has a frequency that may be changed. Changing the frequency of a processor is a common technique for conserving power and preventing overheating. If the clock can change between two different frequencies, a processor-second of capacity or usage at the first frequency is not equal to a processor-second of capacity or usage at the second frequency. For this reason, the capacity and usage of the CPU 510 cannot be readily measured using processor-seconds.

FIG. 6 shows a system that includes two CPUs 610 and 620 of the same type that are run at two different clock speeds. In this situation, a processor-second of capacity or usage for CPU 610 will not be comparable to a processor-second of capacity or usage for CPU 620 because these two CPUs are operating at different clock speeds. Thus, the capacity and usage of the two CPUs 610 and 620 cannot be summed or compared using processor-seconds.

FIG. 7 shows a system that includes two CPUs 710 and 720 of different types that are clocked with different clocks. In this configuration, a processor-second of capacity or usage for CPU 710 is not equal to a processor-second of capacity or usage for CPU 720. Thus, the capacity and usage for the two CPUs 710 and 720 cannot be summed or compared using processor-seconds. Because CPUs 710 and 720 are of different types, a processor-second for CPU 710 is not equivalent to a processor-second for CPU 720, even if the two processors have a common clock.

Note that processors of different types are preferably placed in different classes in the preferred embodiments. What makes a processor of the same type or a different type is subject to any suitable standard or heuristic. One possible standard would define all processors that have identical features in a class. This standard would cause processors of the same basic architecture to be placed in different classes if their configuration is not identical. Thus, PowerPC processors that have different features would be placed in different classes. The preferred embodiments expressly extend to any suitable definition of types of processors and classes.

Other configurations are also possible that make measurement of processor capacity and usage using processor-seconds problematic. For example, in the prior art configuration in FIG. 2, if CPU 210 includes internal circuitry (such as a cache) that may be enabled and disabled and that affects processor performance, the capacity or performance of the CPU 210 with the circuitry enabled will not be comparable to the capacity or performance of the CPU 210 with the circuitry disabled.

Figure 8:
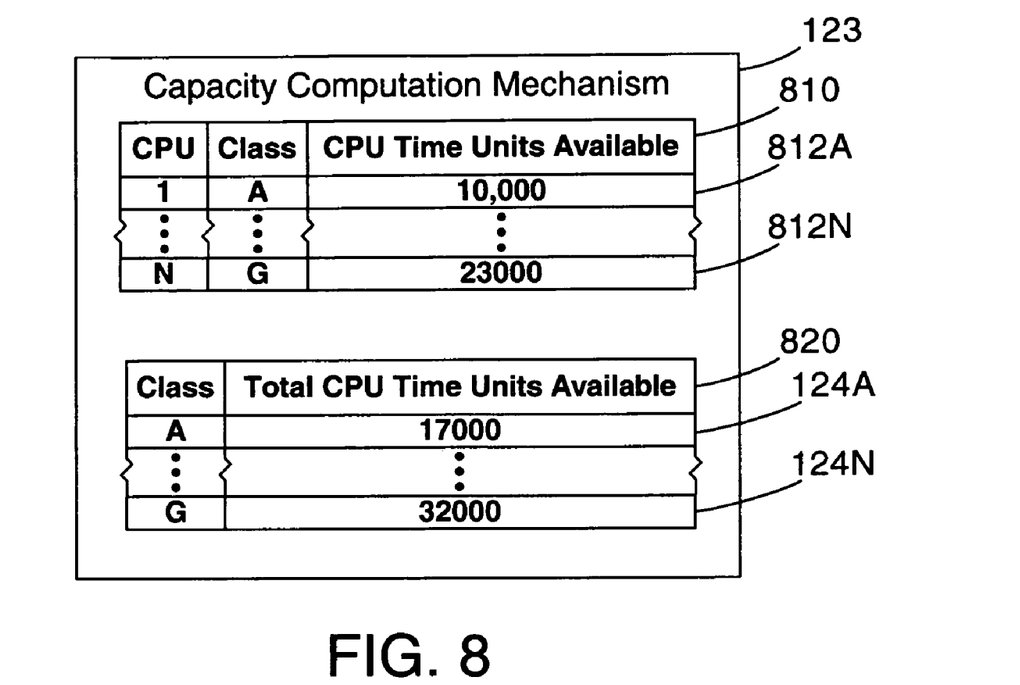
FIG. 8 is block diagram of the capacity computation mechanism in FIG. 1.

A more detailed example of the capacity computation mechanism 123 in FIG. 1 is shown in FIG. 8. In this example in FIG. 8, the capacity computation mechanism 123 includes a table 810 that includes multiple rows. Each row corresponds to a particular CPU (or processor) in the computer system. Each entry in the table 810 identifies the CPU, the class of the CPU, and the CPU Time Units Available for that CPU. Thus, entry 812A is shown that corresponds to CPU 1, which is of class A, with 10,000 CPU Time Units Available. Entry 812N is shown that corresponds to CPU N, which is of class G, with 23,000 CPU Time Units Available. In table 810, there are preferably as many entries as processors in the computer system.

Once the capacity has been computed processor-by-processor and logged into the table 810, the CPU Time Units Available for all processors of the same class are summed together. The resulting data is written to a table 820 that specifies Class and Total CPU Time Units Available. The difference between table 820 and table 810 is that the time units for different processors in table 810 that are in the same class are summed together, thereby arriving at a total number of CPU time units available for each class. Thus, table 820 in FIG. 8 shows that class A has 17,000 Total CPU Time Units Available at entry 124A, while entry 124N shows that class G has 32,000 Total CPU Time Units Available. We see from table 820 in FIG. 8 that any measured quantity of CPU time units will always be tagged with the CPU class.

Figure 9:
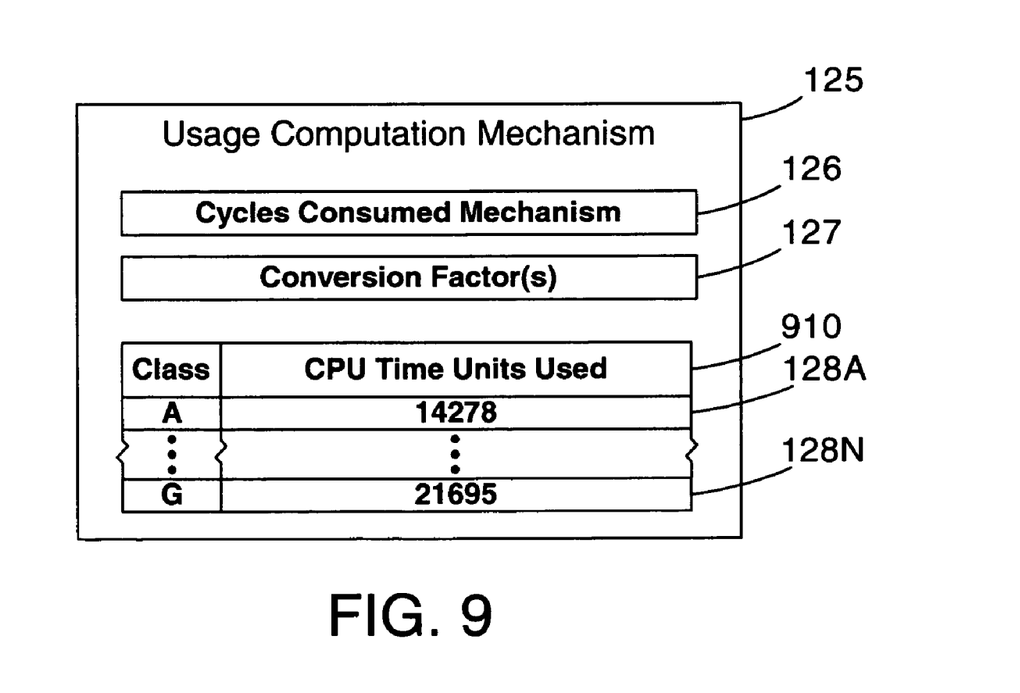
FIG. 9 is block diagram of the usage computation mechanism in FIG. 1.

A more detailed example of the usage computation mechanism 125 in FIG. 1 is shown in FIG. 9. In this example in FIG. 9, the usage computation mechanism 125 includes the cycles consumed mechanism 126, one or more conversion factors 127, and a table 910. Table 910 includes entries 128 that specify a class and a number of CPU Time Units Used for that class. Thus, table 910 in FIG. 9 includes an entry 128A that shows that a total of 14,278 CPU Time Units were used by all processors of class A. Entry 128N shows that a total of 21,695 CPU Time Units were used by all processors of class G.

The preferred embodiments use an abstract unit of measurement referred to herein as "CPU time units" to measure capacity and usage of processors. One simple way to define a CPU time unit is to base it on a certain number of CPU cycles consumed, as indicated by the cycles consumed mechanism 126 for a given period of time. The advantage of basing the CPU time unit on the number of cycles consumed is that the CPU time unit will self-adjust with changes to the CPU clock frequency. A slower clock frequency will cause the same number of CPU cycles to take longer to consume. However, if processors of the same architecture can enable or disable internal circuitry (such as turning an internal cache on or off) while the clock frequency remains unchanged, a conversion factor 127 will have to be used to convert the capacity and performance of a processor to CPU time units. The conversion factor 127 converts a number of CPU cycles consumed, as indicated by the cycles consumed mechanism 126, to the abstract CPU time units. Conversion factors 127 may also be needed when there are multiple CPUs that belong to the same class, but have different performance. Each type of CPU belonging to the same class will have its own conversion factor from CPU cycles consumed to the abstract CPU time unit. This will allow having a common CPU time unit for all processors in a CPU class. In the preferred embodiments, a class may include processors of the same architecture that have different speeds or different enabled internal circuitry. By properly applying the conversion factors 127 to the cycles consumed by each processor (as indicated by the cycles consumed mechanism 126), the cycles consumed may be properly scaled to a consistent abstract CPU time unit. Note that the conversion factors 127 for the different performance levels of the same CPU or for different processors with the same architecture can be determined empirically, based on a set of representative benchmarks.

Another way to define the CPU time unit is to base the CPU time unit on the time (real or virtual) elapsed with the CPU was used. In this scenario, the conversion factor 127 between real time units to the abstract CPU time units will have to be updated whenever the CPU clock changes frequency and whenever some other configuration change occurs that will impact the CPU performance, such as enabling or disabling an internal cache. Each CPU class preferably includes a single common CPU time unit, however each distinct performance level of each CPU in the CPU class and each CPU type belonging to the same CPU class will have its own conversion factor 127.

Figure 10:
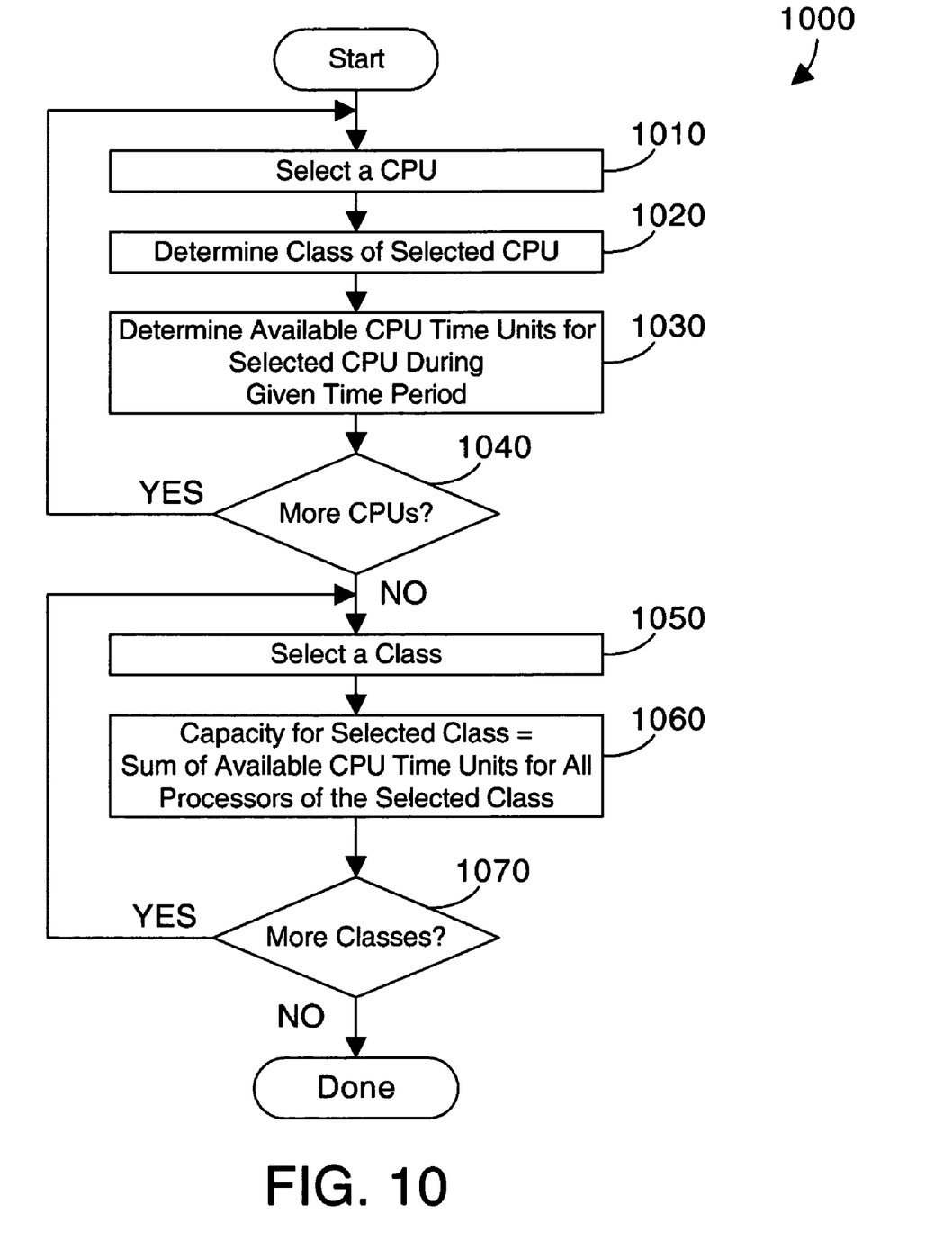
FIG. 10 is a flow diagram of a method in accordance with the preferred embodiments for computing CPU capacity on a class-by-class basis in a computer system that includes multiple processors of different speed and/or architecture.

Capacity of a computer system may be computed using a method 1000 shown in FIG. 10 in accordance with the preferred embodiments. Method 1000 begins by selecting a CPU (step 1010). The class of the selected CPU is determined (step 1020). The available CPU time units for the selected CPU during a given time period are then determined (step 1030). If there are more CPUs to process (step 1040=YES), method 1000 loops back to step 1010 and executes steps 1010, 1020 and 1030 for the next CPU, until all CPUs have been processed (step 1040=NO). Note that steps 1010-1040 in method 1000 build the table 810 shown in FIG. 8.

Once the capacity of all the processors has been computed, we now sum the capacities of all processors of a given class to arrive at a capacity in CPU time units for all processors in each class. Thus, step 1050 selects a class. Next, the capacity for the selected class is computed by summing the available CPU time units for all processors of the selected class (step 1060). If there are more classes to process (step 1070=YES), method 1000 loops back to step 1050 and continues for the next class until there are no more classes to process (step 1070=NO), at which point method 1000 is done. Note that steps 1050-1070 sum the values in the table 810 in FIG. 8 to generate the table 820 in FIG. 8. The end result of method 1000 is the generation of table 820, which lists total CPU time units available for each class of processor. The prior art does not distinguish between different classes of processors. By keeping each different class of processor separate from the other classes of processors, we assure that any comparison of capacity numbers are "apples to apples."

Figure 11:
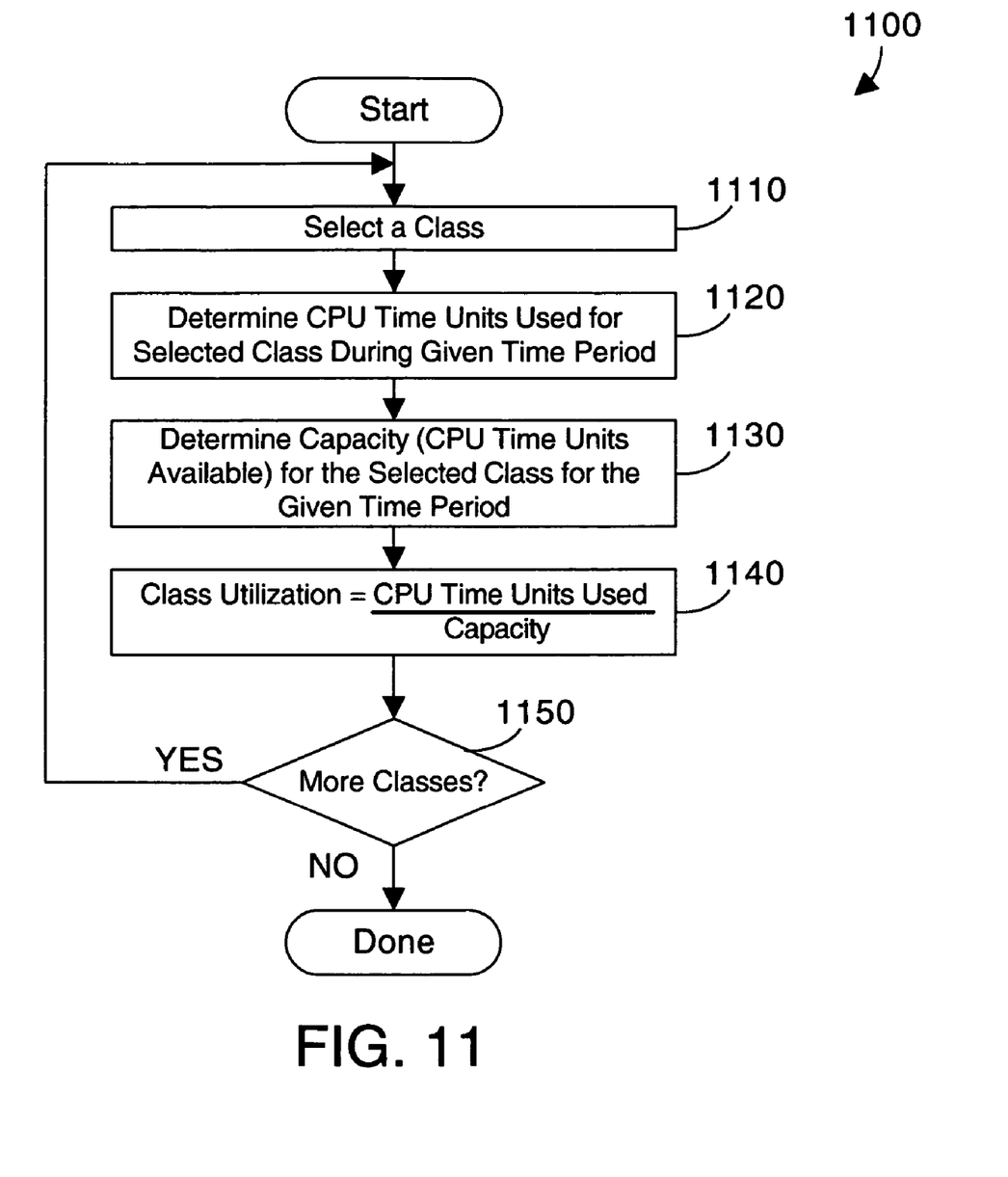
FIG. 11 is a flow diagram of a method in accordance with the preferred embodiments for computing CPU usage on a class-by-class basis in a computer system that includes multiple processors of different speed and/or architecture.

Referring to FIG. 11, a method 1100 for reporting processor usage in accordance with the preferred embodiments begins by selecting a class (step 1110). The CPU time units used for the selected class are then determined for a given time period (step 1120). The CPU time units used that is determined in step 1120 is the processor usage for the given time period. The processor usage may now be converted to processor utilization as a percentage of capacity. The capacity in CPU time units for the selected class for the given time period is determined (step 1130). The class utilization is computed as a percentage of capacity by dividing the CPU time units used during the given time period by the capacity for the given time period (step 1140). If there are more classes to process (step 1150=YES), method 1100 returns to step 1110 and processes steps 1110, 1120, 1130 and 1140 for the next class, until there are no more classes to process (step 1150=NO), at which point method 1100 is done. The result of method 1100 is the usage table 910 shown in FIG. 9 that shows the number of CPU time units used for each class of processor.

The ability to monitor processor usage on a class-by-class basis allows usage to be reported in a new way for individual processes. For example, the usage computation mechanism 125 could monitor usage of processors by a particular process X, and could report that over a given time period process X used 1,000 CPU time units of a CPU class A and 2,000 CPU time units of a CPU class B. Each time a process is dispatched on a processor, the system will determine how much time or how many CPU cycles this process has consumed and which CPU class was assigned to the processor. The CPU cycles consumed by the process will then be converted to the common CPU time unit for the class using one or more conversion factors. In this manner, the preferred embodiments may be efficiently used to track processor usage by individual processes.

The ability to monitor and report processor capacity on a class-by-class basis allows for better capacity planning. The concept of capacity planning is used in the computer industry to help identify system resources in a computer system to satisfy a client's specified performance needs.

The preferred embodiments allow efficiently determining both processor capacity and processor usage on a class-by-class basis according to different defined classes of processors. By separating processors into different classes, the risk of comparing or summing the capacity or usage of non-compatible classes is eliminated. In essence, the capacity and usage of each processor class is monitored and reported individually, thereby providing a more accurate view of the capacity and usage of processors in a computer system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for determining usage of a plurality of processors in a computer system, the method comprising the steps of:
    (A) dividing the plurality of processors into a plurality of classes according to processor architecture, where each of the plurality of classes corresponds to a different processor architecture;
    (B) determining capacity of all processors in each of the plurality of classes, where the capacity is a number of abstract units of measure comprising processor time units available for consumption during the given time period;
    (C) determining capacity for each of the plurality of classes from the capacities determined in step (B);
    (D) determining usage of all processors in each of the plurality of classes in an abstract unit of measure;
    (E) determining usage for each of the plurality of classes from the usages determined in step (D); and
    (F) determining percentage utilization for each of the plurality of classes by dividing the usage for a selected class determined in step (E) by the capacity for the selected class determined in step (C).

2. The method of claim 1 wherein step (D) determines usage of all processors for each of a plurality of processes.

3. The method of claim 1 wherein each of the plurality of classes includes all processors of the same processor architecture that run at different speeds.

4. A method for determining class utilization for a computer system that includes a plurality of processors, the method comprising the steps of:
    (A) defining a plurality of classes for the plurality of processors, where each of the plurality of classes corresponds to a different processor architecture;
    (B) for each of the plurality of processors, performing the steps of:
        selecting a processor;
        determining from the architecture of the selected processor a corresponding class for the selected processor; and
        determining capacity for the selected processor in an abstract unit of measure comprising processor time units during a given time period;

(C) for each of the plurality of classes, performing the steps of:
  selecting a class; and
  computing capacity for the selected class during the given time period by summing capacity for all processors in the selected class during the given time period;
(D) for each of the plurality of classes, performing the steps of:
  selecting a class;
  summing usage of all processors in the selected class during the given time period, where the usage is a number of the abstract units of measure used during the given time period; and
  determining class utilization for the selected class by dividing the sum of the usage of all processors in the selected class during the given time period by the capacity for the selected class.

5. A method for determining usage for a plurality of processors in a computer system by a selected process, the method comprising the steps of:
  (A) defining a plurality of classes for the plurality of processors, where each of the plurality of classes corresponds to a different processor architecture;
  (B) computing capacity for each class by performing the steps of:
    (B1) for each of the plurality of processors, performing the steps of:
      selecting a processor;
      determining from the architecture of the selected processor a corresponding class for the selected processor;
      determining capacity for the selected processor in processor cycles during a given time period; and
      using a conversion factor to convert the capacity for the selected processor in processor cycles to an abstract unit of measure comprising processor time units during the given time period;
    (B2) for each of the plurality of classes, performing the steps of:
      selecting a class; and
      computing capacity for the selected class during the given time period by summing capacity for all processors in the selected class in the abstract unit of measure during the given time period;
  (C) for each of the plurality of classes, performing the steps of:
    selecting a class;
    determining usage of all processors in the selected class by the selected process in processor cycles during the given time period; and
    using a conversion factor to convert the usage for a selected processor in processor cycles to the abstract unit of measure;
  (D) summing usage of all processors in all of the plurality of classes by the selected process in the abstract unit of measure during the given time period.

* * * * *